United States Patent [19]

Matsumoto et al.

[11] Patent Number: 5,218,638
[45] Date of Patent: Jun. 8, 1993

[54] ENCIPHER METHOD AND DECIPHER METHOD

[75] Inventors: Hiroshi Matsumoto, Sagamihara; Kazuo Takaragi, Ebina; Yasuko Fukuzawa, Sagamihara, all of Japan

[73] Assignees: Hitachi Ltd., Tokyo; Hitachi Chubu Software, Ltd., Aichi, both of Japan

[21] Appl. No.: 802,724

[22] Filed: Dec. 5, 1991

[30] Foreign Application Priority Data

Dec. 7, 1990 [JP] Japan ............................. 2-400806

[51] Int. Cl.⁵ .......................... H04K 1/00; H04L 9/00
[52] U.S. Cl. ........................................ 380/23; 380/4; 380/25
[58] Field of Search .......................... 380/4, 23, 24, 25

[56] References Cited

U.S. PATENT DOCUMENTS

| | | | |
|---|---|---|---|
| 4,881,264 | 11/1989 | Merkle | 380/25 |
| 4,885,777 | 12/1989 | Takaragi et al. | 380/23 |
| 4,982,429 | 1/1991 | Takaragi et al. | 380/28 |
| 5,018,196 | 5/1991 | Takaragi et al. | 380/30 |
| 5,117,458 | 5/1992 | Takaragi et al. | 380/4 |

FOREIGN PATENT DOCUMENTS 63-280530 5/1987 Japan.

Primary Examiner—David Cain
Attorney, Agent, or Firm—Antonelli, Terry, Stout & Kraus

[57] ABSTRACT

A method and apparatus for carrying out limited encipherment broadcast by generating a cipher key obtained from destination information added to service information are provided. An information service station transmits to each receiving station a random number, destination information for designating a destination station, and enciphered data obtained by enciphering service information by a common key generating by using the random number and destination information. An IC card at each receiving station which is provided in advance with a key generating function from the information service station, generates the common key by using the received random number and destination information only when it is confirmed from the destination information that the receiving station has a data reception right, and deciphers the enciphered data by using the common key to obtain the original service information. The processing time required for generating the common key can be reduced because of a small amount of data to be used.

18 Claims, 13 Drawing Sheets

SYSTEM CONFIGURATION

SYSTEM CONFIGURATION

PROCEDURE AT RECEIVING STATION

FORMAT OF TRANSMISSION DATA

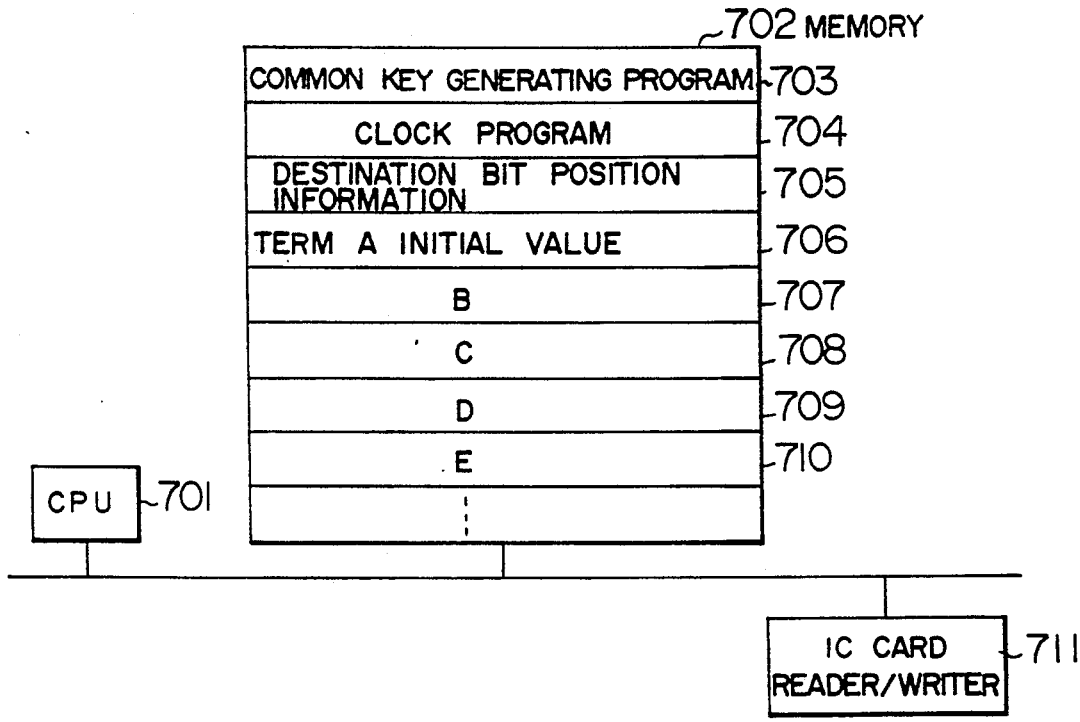
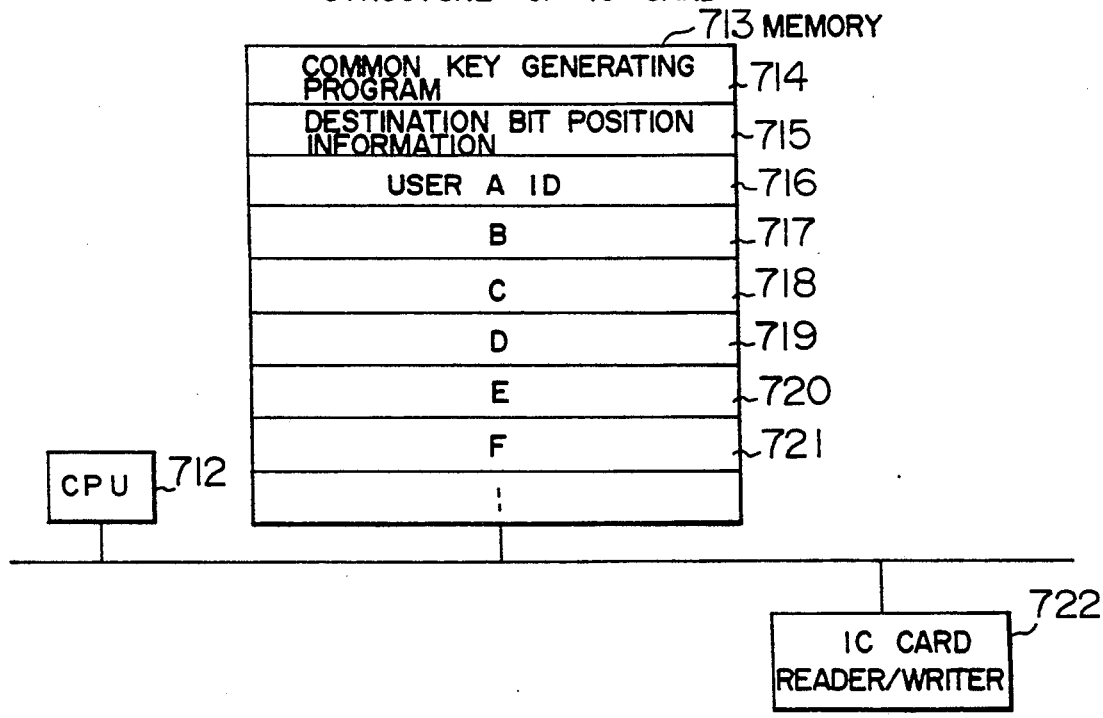

FLOW CHART OF TERM MANAGEMENT

PROCEDURE AT INFORMATION SERVICE STATION

PROCEDURE AT RECEIVING STATION

FORMAT OF TRANSMISSION DATA

STRUCTURE OF IC CARD

ENCIPHER METHOD AND DECIPHER METHOD

BACKGROUND OF THE INVENTION

The present invention relates to a limited broadcasting method and system for communication networks.

As societies become highly computerized, information service is now available through broadcast communications via a satellite, local area network (LAN), cable television (CATV) network, integrated services digital network (ISDN) or the like.

For information communications service, it is important that various information such as movies, news, market information, investment information, software, information within a company, and conference information between company departments, is required to be supplied correctly and sufficiently to subscribers. It is also important that secret information or highly value-added information should not be leaked at all to any third parties.

In communications having a broadcast function such as satellite communications and token broadcasting, signals transmitted at a physical level reach basically all receivers. In order to regulate information destinations in broadcast communications, it is effective if cryptographic technique is used.

As well known, in cryptographic communications, a sender enciphers a plaintext by using an encipher key and transmits a ciphertext. A receiver receives the ciphertext and deciphers it into the plaintext by using a decipher key to obtain the original information transmitted from the sender. The encipher key is in one-to-one correspondence with the decipher key, and only a person having the decipher key can decipher the ciphertext. In other words, the original information is provided only in such a case. A person not having the decipher key cannot decipher the ciphertext so that the original information will not be provided.

By using such characteristics of cryptographic communications, it becomes possible to regulate information destinations in broadcast communications. Namely, after a decipher key is given only to a plurality of limited destinations, a ciphertext is broadcast. With such an arrangement, original information is allowed to be accessed only by authorized destinations. Although physical signals are received by unauthorized third parties, they have not a decipher key so that the original information cannot be accessed. The limited broadcast in cryptographic communications has the following problem. In large information services, there are several to ten thousands receiving stations and a great number of types of information to be supplied. Different stations desire to receive different types of information at different service times. Therefore, an information service station is required to prepare a great number of reception patterns. Each time a different reception pattern is used, a decipher key at a receiving station must be changed, resulting in a large burden on the information service station.

A conventional technique dealing with such a problem is disclosed, for example, in JP-A-63-280530 which provides a secret key generator for unidirectional communications with a 1: N ratio between a sender and receivers.

In this conventional technique, as shown in FIG. 15, 1: N ($N \leq 2$) communications are carried out in the following manner. In bi-directional secret communications among three or more receiving stations, each receiving station independently inputs all identification codes ID other than its own identification code ID to an input terminal 1501 of its own secret code generator CD. Assume now that the group members include users A, B, and C. User A inputs identification codes IDB and IDC of users B and C other than its own identification code IDA to the input terminal 1501 of the secret key generator CR. Using the identification codes IDB and IDC inputted from the input terminal 1501, the values F(IDB) and F(IDC) are calculated using a one way function F(*) generator 1502 having the structure common to all users. The calculated values are added at a modulo-2 adder 1509 to a random number R stored in a third memory 1508 and common to all users of the network or data communication system and a stored one way function value F(IDA) of the identification code IDA of user A, thereby obtaining a one way function value ro given by an equation (1):

$$r0 = R \oplus F(IDA) \oplus F(IDB) \oplus F(IDC) \quad (1)$$

The one way function value ro is inputted to another one way function f(*) generator 1506 having the structure common to all users to obtain a secret key $K_{ABC} = f(ro)$ which is outputted from an output terminal 1507. User A is permitted to carry out secret communications by using the secret key $K_{ABC}$ specific only to the group members A, B and C.

Similarly, user B inputs identification codes IDA and IDC of users A and C other than its own identification code IDB to the input terminal 1501 of the secret key generator CR. Using the identification codes IDA and IDC inputted from the input terminal 1501, the values F(IDA) and F(IDC) are calculated using a one way function F(*) generator 1502 having the structure common to all users. The calculated values are added at a modulo-2 adder 1509 to a random number R stored in a third memory 1508 and common to all users of the network or data communication system and a stored one way function value F(IDB) of the identification code IDB of user B, thereby obtaining a one way function value ro given by the equation (1). The one way function value ro is inputted to another one way function f(*) generator 1506 having the structure common to all users to obtain the secret key $K_{ABC} = f(ro)$ which is outputted from an output terminal 1507. User B is permitted to carry out secret communications by using the secret key $K_{ABC}$ specific only to the group members A, B and C.

Similarly, user C inputs identification codes IDA and IDB of users A and B other than its own identification code IDC to the input terminal 1501 of the secret key generator CR. In the same manner as described with users A and B, the secret key $K_{ABC}$ is given to user C.

The above-described conventional technique has the following two problems. For example, in the process executed on the side of user A, instead of inputting IDB and IDC to the secret code generator CR, it is assumed that user A intentionally inputs IDB, IDC, IDA, and IDD which is an ID for the fourth user. In this case, the calculation results by the adder 1509 are given by an equation (2):

$$\begin{aligned} ro &= R \oplus F(IDA) \oplus F(IDB) \oplus F(IDC) \oplus F(IDA) \oplus F(IDD) \\ &= R \oplus F(IDA) \oplus F(IDA) \oplus F(IDB) \oplus F(IDC) \oplus F(IDD) \\ &= R \oplus F(IDB) \oplus F(IDC) \oplus F(IDD) \end{aligned} \quad (2)$$

The calculation of an exclusive logical sum has the same results even if the calculation order of respective terms is changed, and because of $F(IDA) \oplus F(IDA) = 0$. This $r'_0$ is a secret key for users B, C, and D. Therefore, user A can intentionally obtain a secret key for users B, C, and D and not for user A. Such a case is applicable to all users in the network. Accordingly, in conventional 1:N ($N \geq 2$) communications, a user which is not permitted to participate secret communications can have a secret key, intercept the cryptographic communications, and decipher a ciphertext.

The above-described conventional technique does not disclose means for notifying N+1 users in 1:N cryptographic communications of whom they are in cryptographic communications with. For example, in the operation by user A, the secret key cannot be obtained unless user A is notified that it carries out cryptographic communications not with users E and F but with B and C. In such a case, it can be considered that one of users constituting a communication group is required to notify the other users of all user IDs. Accordingly, if a system has a large N (e.g., N=10,000), it is necessary to transmit beforehand data as along as N x ID, resulting in a large burden on the system.

In order to solve the above problems, the present inventors have proposed a technique of generating a limited broadcast encipher key as disclosed in the specification of U.S. Ser. No. 07/606898. According to this technique, in a secret broadcast communication system, it is possible to prevent interception and illegal tapping of a ciphertext by third parties, and to reduce a burden on the whole system by making it unnecessary to supply information of IDs of all users each time a secret communication is carried out using IC cards.

According to the earlier application technique of generating a limited broadcast encipher key, each system subscriber generates a secret key by using open ID information of all subscribers, in accordance with the data sent from a service center. This technique is associated, however, with the problems to be taken into consideration.

Each ID information has generally 4 to 32 bytes. If a system has N destinations, the ID information of 4N to 32N bytes is required. As the value N becomes larger, it takes a longer time to input the ID information to IC cards.

Each terminal station holds the ID information so that a burden on the terminal system increases as the number of system subscribers becomes large.

SUMMARY OF THE INVENTION

It is an object of the present invention to provide a limited broadcast method and system for a plurality of users, capable of reducing a load on a limited broadcast function and readily performing user selection/change.

According to one aspect of the present invention, bit position information of destination information for a receiving station is stored in secret in a hardware such as an IC card. The hardware is physically guarded from outputting its internal process program. The destination information received from a broadcast station is checked as to whether a flag representative of a data reception right is set at the bit position of the received destination information indicated by the bit position information. If the check result shows that the receiving station has the data reception right, a hash total matching the inputted destination information is outputted and which is used as a decipher key for deciphering the cipher data from the information service center into the original plaintext.

More in detail, the information service station transmits at each broadcast the destination information comprised of a bit train representative of a data reception right of each receiving station, an end bit train indicating an end of the destination information and an additional random number added subsequent to the end bit train, and a ciphertext data enciphered by a hash total matching the destination information. If the generated destination information contains the bit pattern same as that of the end bit train, a specific bit is inserted into the end bit train. At the receiving station terminal, this specific bit inserted in the received destination information is deleted, and thereafter, the destination information is inputted to the IC card to obtain the hash total which is used as a decipher key for deciphering the enciphered data.

With such a structure of the present invention, a key generator generates a common key only if the receiving terminal or station has a data reception right. At the limited broadcast, key generators of all stations having the data reception right can generate the same common key. If the key generator is embodied by an IC card, this portable IC card can be used at another remote terminal to generate the common key and receive information service.

In carrying out the limited broadcast by an information service station, the amount of control information for designating information destinations corresponds to the number of network members multiplied by one bit. Also in generating a decipher key at a receiving station, the amount of information inputted to the key generator corresponds to the number of network members multiplied by one bit. If a random number is used in addition to the control information, a different common key can be generated each time the limited broadcast is carried out, preventing illegal generation of the common key which might be obtained through learning of the same common key repetitively used.

BRIEF DESCRIPTION OF THE DRAWINGS

FIGS. 7A and 7B show examples of the internal structure of an IC card possessed by each receiving station.

DESCRIPTION OF THE PREFERRED EMBODIMENTS

Figure 1:
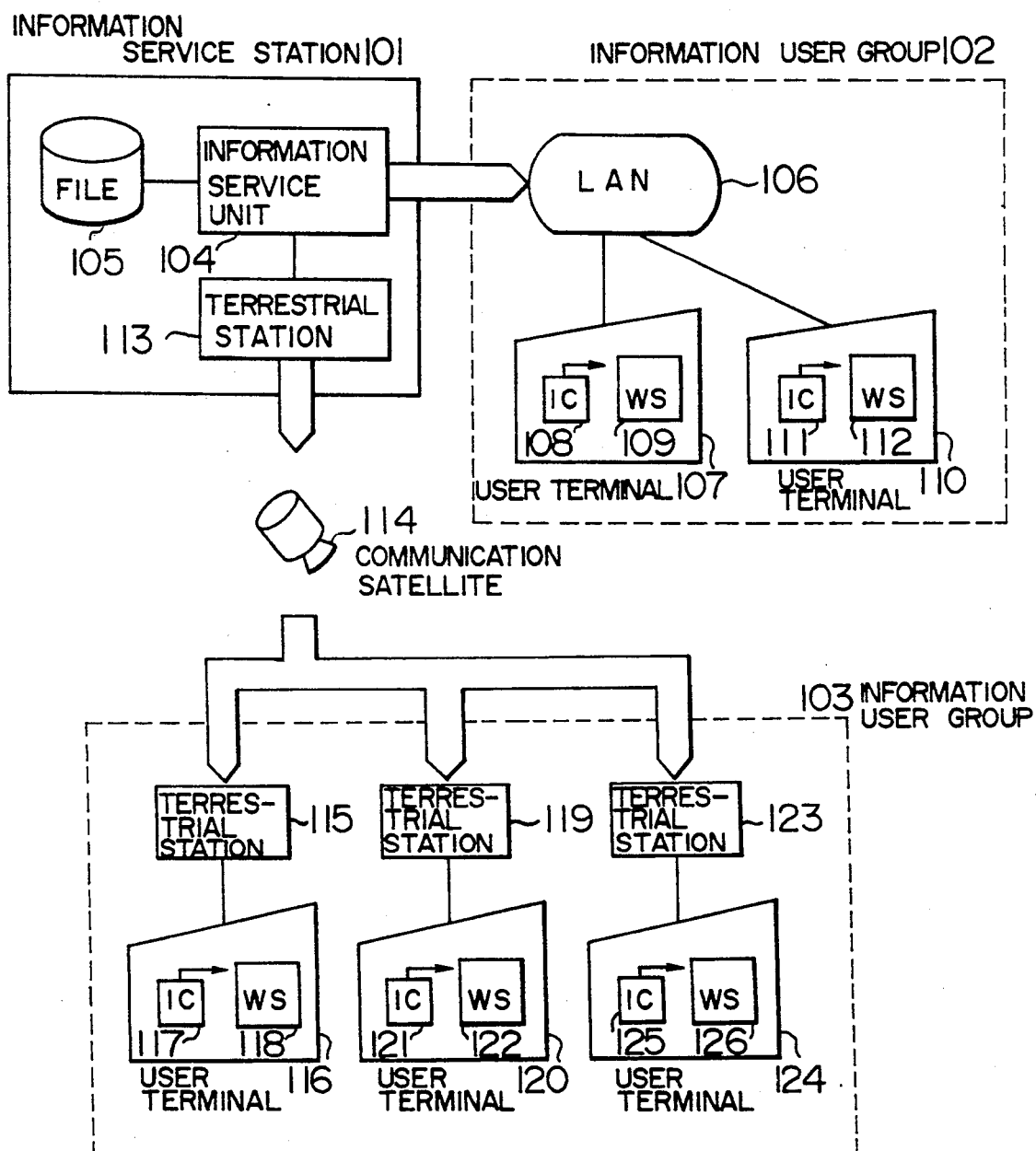
FIG. 1 is a block diagram showing the system configuration of a limited broadcast system according to an embodiment of the present invention.

The embodiments of the present invention will be described with reference to the accompanying drawings. In the drawings, identical symbols and numerals represent like components and elements.

First Embodiment

FIG. 1 is a block diagram showing an embodiment of a broadcast system according to the present invention. This system includes an information service station 101 and information receiving groups 102 and 103. In the information service station 101, an information service unit 104 processes service information stored in a file 105. The processed service information is transmitted to user terminals 107 and 110 via a local area network 106, or to user terminals 116, 120, and 124 of corresponding terrestrial stations 115, 119, and 123 via a terrestrial station 113 and communication satellite 114. The user terminals 107, 110, 116, 120, and 124 are constructed of combinations of workstations (WS) 109, 112, 118, 122, and 126, and IC cards 108, 111, 117, 121, and 125 to be described later with reference to FIGS. 7A and 7B. Such a system may use the system arrangement described in the above-described U.S. Ser. No. 07/606,898.

Figure 2:
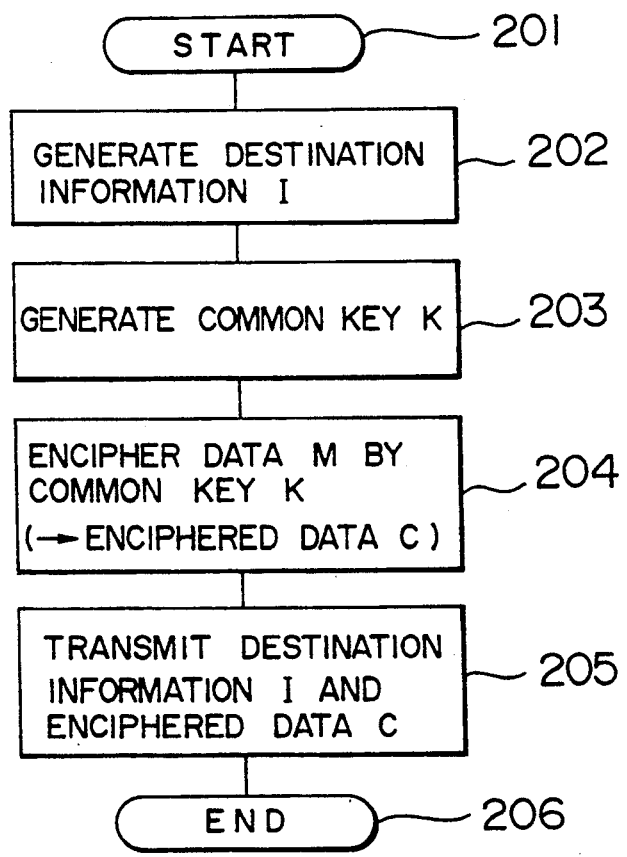
FIG. 2 is a flow chart showing the procedure to be executed by the information service station shown in FIG. 1.

FIG. 2 is a flow chart showing the procedure to be executed by the information service unit 104 of the information service station 101 for realizing a limited broadcast function.

Referring to FIG. 2, the information service station starts setting up the limited broadcast function for information service (Step 201). The information service station generates destination information I having the data structure shown in and later described with FIG. 6 (step 202), and thereafter generates a cipher common key K (step 203). The method of generating the common key will be detailed later with reference to FIG. 3. The service information M stored in the service information file 105 is enciphered using the generated common key K to obtain enciphered data C (step 204). The generated destination information I and enciphered data C are transmitted to user terminals via communication means such as a satellite or cable (step 205). After the limited broadcast operation, the processes at the information service station are terminated (step 206).

Figure 3:
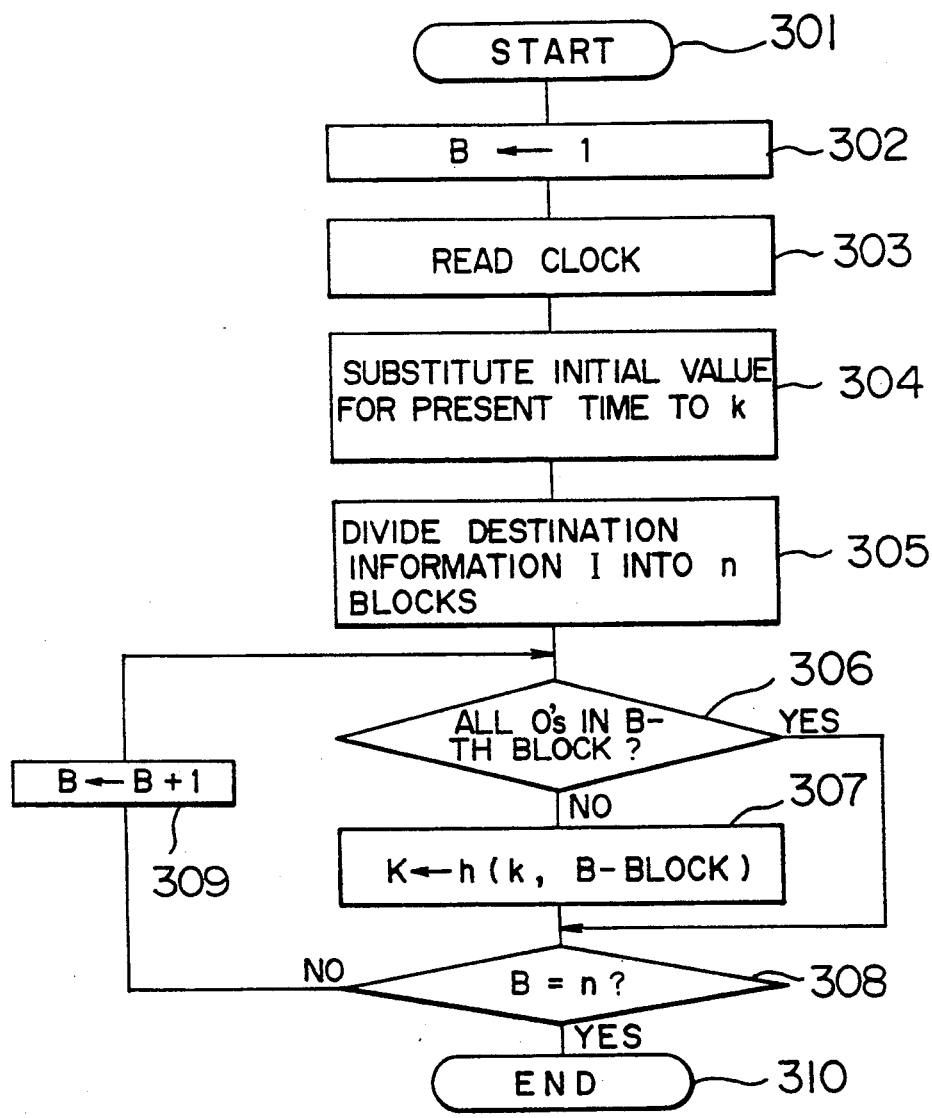
FIG. 3 is a flow chart detailing the key generating step of FIG. 2.

FIG. 3 is a flow chart showing an example of the detailed procedure of the step 203 for generating the common key K at the information service station 104 shown in the flow chart of FIG. 2.

The procedure starts in response to an instruction of generating the common key K for enciphering the service information M (step 301). First, "1" is set to B which represents the block number parameter of n divided blocks of the destination information I for all subscriber stations, whereby each block is ready for a hashing process using a hash function h(k, B-block) (step 302).

The present time is read (step 303), and a term initial value for the read-out present time is used as the parameter k which is a parameter of the hash function (step 304).

The destination information I is divided into n blocks for the purpose of information compression using a hash total (step 305). If all bits in the divided B-th block B-block of the destination information I are "0" representative of that the subject subscriber station has no data reception right, the control advances to step 308 for the next block, and if not, the control advances to step 307 for the hashing process (step 306). Using the parameter k and block order B as the arguments of the hash function h, the hash total is calculated and set as the common key parameter K (step 307). If all blocks are checked, i.e., if B=n, that is, if the processing for all blocks is completed the key generation for the common key k is achieved. If not, the control advances to step 309 for repeating the loop (step 308). At the step 309, B is incremented by "1". The loop from the step 306 is repeated until it becomes B=n.

The step 306 is provided for reducing the process time. For example, this step is effective for the case where there are a number of blocks all receiving stations of which have no data reception right, because of a small number of information destinations. If such a case is considered to rarely occur, this step 306 may be omitted.

Figure 4:
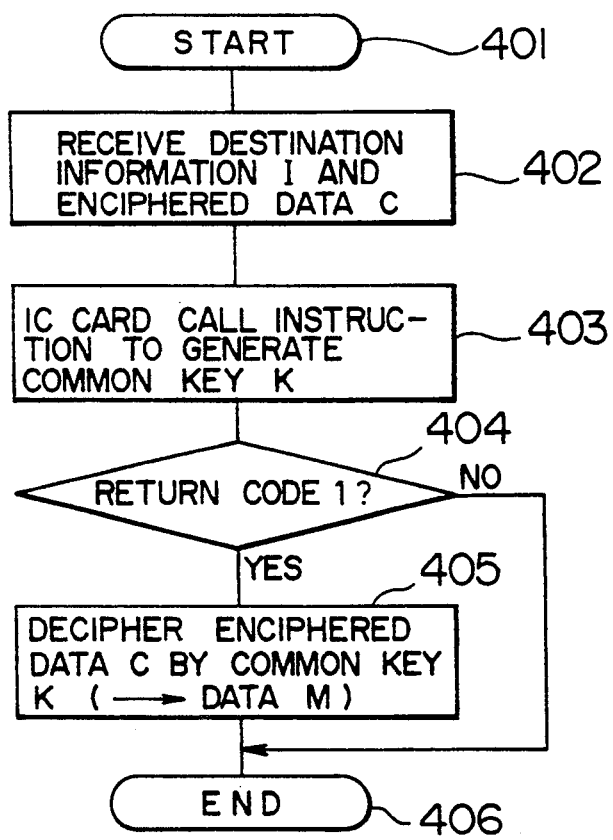
FIG. 4 is a flow chart showing the procedure to be executed by a receiving station.

FIG. 4 is a flow chart showing the reception procedure to be executed by each user terminal 107, 110, 116, 120, and 124 of the system shown in FIG. 1.

Each receiving station starts the reception operation of receiving the information service provided by the information service station, by using a limited broadcast reception unit provided in advance to the receiving station and made of an IC card for example (step 401). The receiving station receives the destination information and enciphered data C transmitted from the information service station (step 402).

After the step 402, there is executed an instruction for calling the IC card provided in advance to the receiving station, to thereby generate the common key K for deciphering the enciphered data C in the manner described in detail with reference to FIG. 5 step 403). If a return code at the step 403 is "0", the control advances to step 406, and if it is "1", the control advances to step 405 (step 405). The received enciphered data C is deciphered using the common key K generated at the step 402 to provide the original service information M (step 405). The reception operation terminates at step 406.

Figure 5:
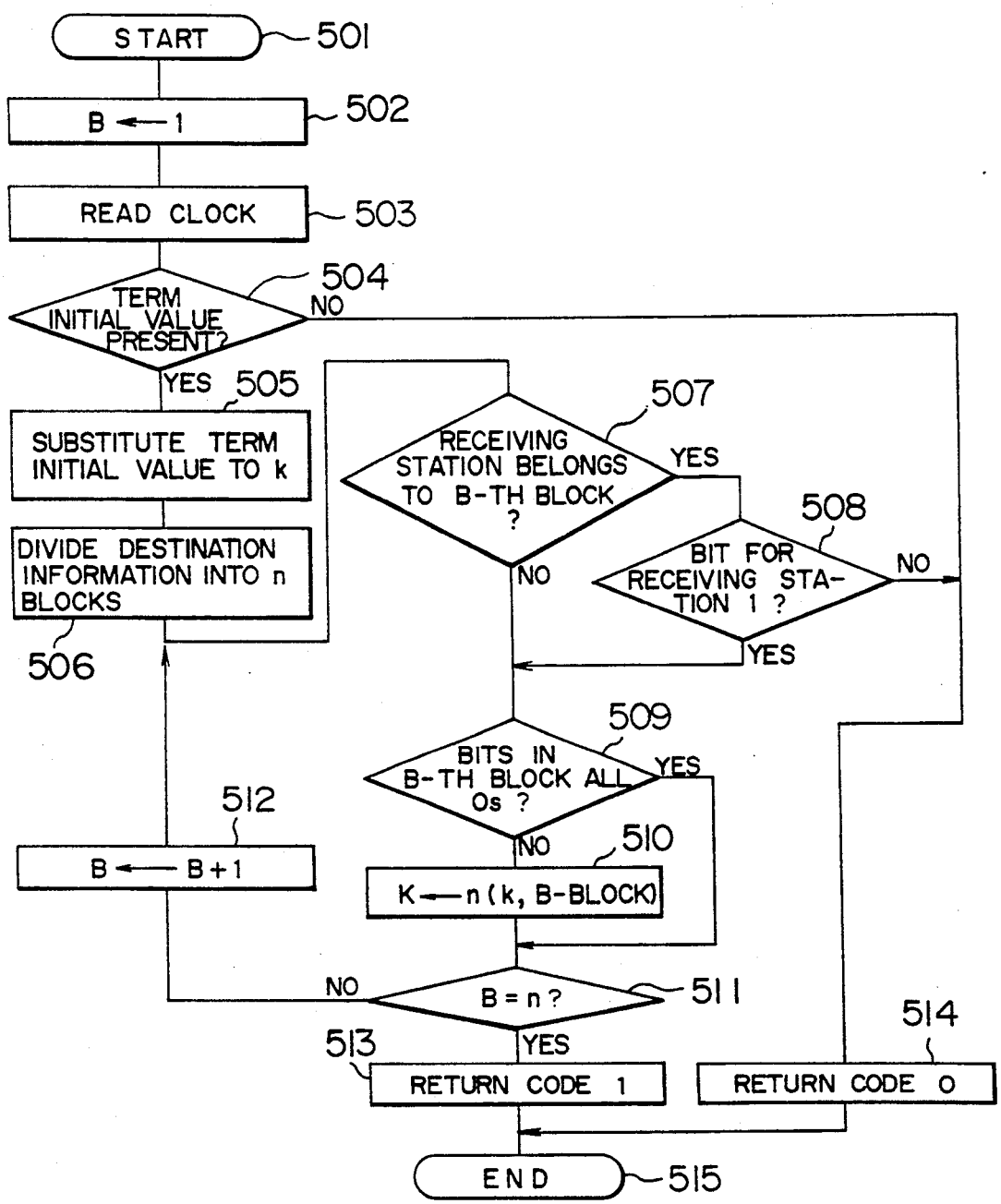
FIG. 5 is a flow chart detailing the key generating step of FIG. 4.

FIG. 5 is a flow chart showing the detailed procedure of the step 403 for generating the common key K shown in the flow chart of FIG. 4. This procedure is executed by a processor whose internal processes can be physically guarded from access and change by any user, like the IC cards 108, 111, 117, 121, and 125 shown in FIG. 1. For example, such a processor is provided with a logic/instruction circuit which locks or evaporates the contents of a memory in response to a request for reading the internal processes. The type of IC card prescribed in No. 10202 of ISO may be used herein.

First, "1" is set to B which represents the block number parameter of n divided blocks of the destination information I (step 502). The present time is read (step 503). If the term initial value for the read-out present time exists in a memory of the IC card, the control advances to step 505, and if not, the control advances to step 514 (step 504). The detailed procedure of this step 504 will be described later with reference to FIG. 7A.

The term initial value is substituted as the parameter k of the hash function (step 505). The destination information I is divided into n blocks for preparation of the hashing process for each block (step 506). If the block number of the receiving station stored in advance in the memory of the IC card is B, then the control advances to step 508, and if not, the control advances to step 509 (step 507). If the bit in the divided B-th block of the receiving station stored in advance in the memory of the IC card is "1" representative of that the receiving station has no data reception right, then the control advances to step 509, and if not, the control advances to step 514 (step 508). If all bits of the divided B-th block are "0" representative of that all receiving stations within the block have no data reception right, then the control advances to step 511, and if not, the control advances to step 510 (step 509). Using the parameter k and the divided block number B as the arguments of the hash function, the hash total is calculated and substituted to the parameter k used as the common key K (step 510). If B = n, the control advances to step 513, and if not, the control advances to step 512 (step 511). B is incremented by 1 at step 512, and thereafter the control advances to step 507. The parameter k is thus provided for the common key K to complete the procedure, at which the return code is set to "1". The return code "1" represents a normal operation so that the deciphering process at the step 405 shown in FIG. 4 is then executed. On the other hand, the return code is set to "0" to terminate the procedure (step 514).

If the step 306 of FIG. 3 is omitted, the corresponding step 509 is omitted. The steps 507 and 508 confirm the data reception right in generating the hash total.

The following modifications of generating an encipher/decipher common key are possible.

Modification 1

If the number of receiving stations having the data reception right is small, the information of the positions of bits "1" only is used as the destination information.

Modification 2

Three types of algorithms are prepared at both the transmitting and receiving stations. A first algorithm is for generating the common key with the step 306 of FIG. 3 and the step 509 of FIG. 5. A second algorithm is for generating the common key without the steps 306 and 509. A third algorithm is for generating the common key using the Modification 1 destination information.

Modification 3

The destination information and a random number different at each data transmission are used for generating the common key using the hash function. In this manner, even the same destination information, a different common key can be generated at each data transmission.

Figure 6:
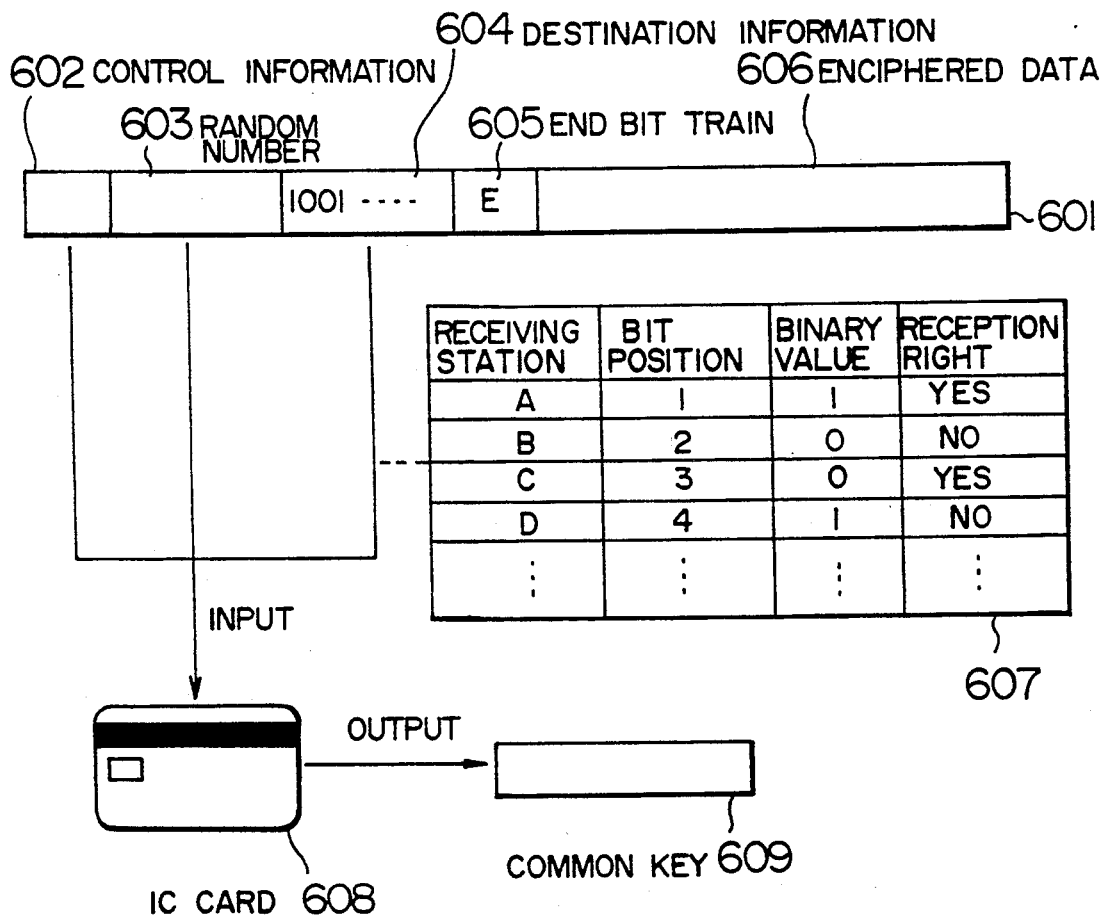
FIG. 6 shows the format of data to be transmitted from the information service station to each receiving station.

FIG. 6 shows an example of the format of data transmitted from the information service station to receiving stations and schematically illustrates an operation of generating a common key, in accordance with a combination of Modifications 1, 2, and 3.

Transmission data is constructed of control information 602, random number 603, destination information 604, end bit train 606, and ciphered data 606. Each receiving station generates a common key 609 using the control information 602, random number 603, and destination information 604 respectively inputted to its IC card 608.

The control information 602 is used for selecting one of the three algorithms described with Modification 2.

The random number 603 is used for generating a common key from the hash function as described with Modification 3.

Each bit of the destination information 604 is assigned to a particular receiving station as shown in an information table 607. The binary value of each bit represents a data reception right of its receiving station. For example, the first to fourth binary values of the destination information 604 discriminate whether the corresponding receiving stations A, B, C, and D are to be permitted to receive service information. If the binary value of each receiving station A, B, C, and D is "1", it means that the enciphered data 606 following the destination information on the data format is permitted to be deciphered. If it is "0", it means that the enciphered data 606 is inhibited to be deciphered. In the example shown in FIG. 6, the receiving stations A and D can decipher the enciphered data 606 and the receiving stations B and C cannot decipher the enciphered data 606.

The end bit train 605 indicates the end of the destination information 604. With this end bit train, the destination information 604 is possible to have a variable length. If the destination information 604 includes the same bit pattern of the end bit train 605, it is not possible to identify the true end bit train 605. In this case, a predetermined bit "0" or "1" is inserted in the bit train of the destination information 604 at a specific position in such a manner that the destination information 604 will not include the bit pattern of the end bit train 605. For example, assuming that the bit pattern of the end bit train 605 is first intended to be set to "10101010" and the destination information 604 includes the same bit pattern, a bit "1" is unconditionally inserted as the last bit of the end bit train after it takes "1010101".

FIG. 7A shows the internal structure of the IC card which executes the procedure shown in FIG. 4. The IC card includes a CPU 701, memory 702, IC card reader/writer 711, and bus for interconnection between these units.

A common key generating program 703 in the memory 702 is sequentially executed by CPU 701 to output a common key from the IC card reader/writer. Destination bit position information 705 in the memory 702 indicates the bit position of the receiving station within the destination information. The term initial values 706, 707, 708, 709, and 710 are the initial values assigned to respective terms of the effective period of the IC card, and are used for generating a hash total. A clock program 704 is provided for selection of one of the term initial values 706, 707, 708, 709, and 710. The effective period is determined in accordance with the contract between the information service station and the receiving station. For example, if the reception contract is effective for five years, the term initial value for the fifth year is stored in the term initial value 710 field.

A modification of the structure of the IC card shown in FIG. 7A will be described with reference to FIG. 7B. In this modification, a common key is generated using user identifications (IDs). This IC card is constructed of a CPU 712, memory 713, IC card reader/writer 722, and internal bus.

The information service station holds the data of IDs of all receiving stations. A common key for encipherment at the information service station is generated by inputting IDs of the receiving stations having a data reception right to the hash function.

The receiving station holds IDs 716, 717, 718, 719, 720, and 721 of all receiving stations in the memory 713 of the IC card shown in FIG. 7B. If it is confirmed from the bit of destination bit position information 715 that the receiving station has the data reception right, then CPU 712 runs a common key generating program 714 to generate a common key using, as the input of the hash function, IDs of the receiving stations having the data reception right. The generated common key is outputted from the IC card reader/writer 722.

Figure 8:
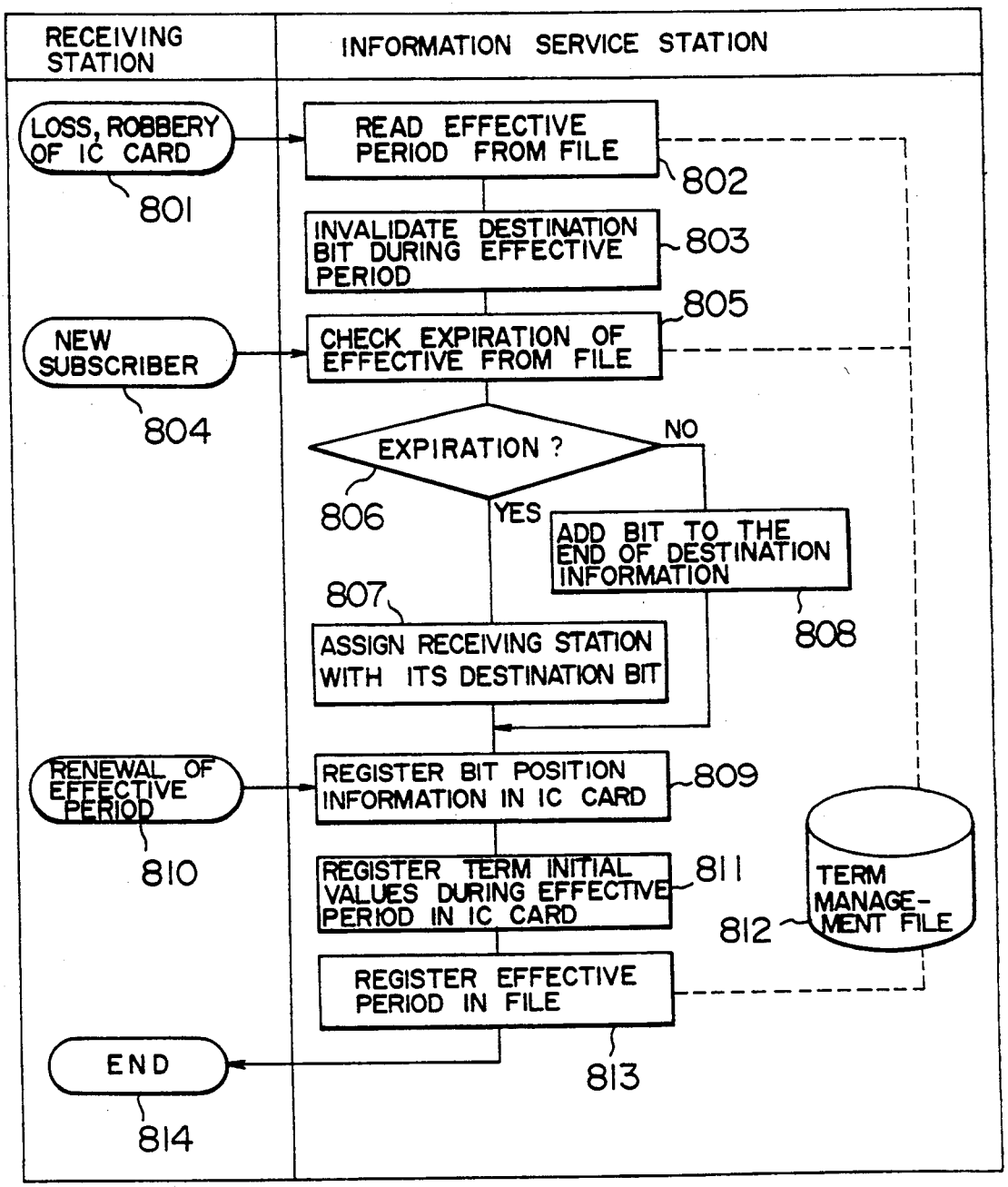
FIG. 8 is a flow chart showing a term managing procedure.

FIG. 8 is a flow chart illustrating a term management procedure. The left side of FIG. 8 shows the procedure to be executed at the receiving station, and the right side shows the procedure to be executed at the information service station, i.e., service center.

If a new receiving station is to be subscribed, the following processes are executed. The new receiving station asks the service center for new subscription (step 804). The service center searches a term management file 81 if there is any receiving station whose service period has expired (step 805). The term management file 81 stores the effective periods of all receiving stations. If there is a receiving station with an expired service period, the control advances to step 807, and if not, the control advances to step 808 (step 806). The service center assigns the new receiving station with the bit of the destination information of the receiving station with an expired service period, and thereafter the control advances to step 809 (step 807). If there is no receiving station with an expired service period, one bit for the new receiving station is added to the end of the bit train of the destination information, and thereafter the control advances to step 809 (step 808). The position of the bit within the destination information newly assigned at step 807 or 808 is stored in the memory of an IC card (step 809). The initial values of terms during an effective service period are written in the memory of the IC card, and this IC card is provided to a receiving station user (step 811). At step 813, the effective service period written in the IC card is registered in the term management file 812 to complete the new subscription procedure (step 814). If a receiving station request to renew the effective service period, the receiving station asks the service center for renewal of the effective service period at step 810, and thereafter the control advances to step 811.

In the case of loss, robbery, or plunder of an IC card, the following processes are executed. The receiving station asks the service center for reissue of an IC card (step 801). The service center reads the effective service period from the term management file 812 (step 802). The bit in the destination information for the receiving station is flagged during the effective service period so as to indicate that the receiving station has no more the data reception right by maintaining "0" at the bit position which indicates no permission of reception, and the control advances to step 805 (step 803).

Instead of an IC card having term initial values, an IC card having a self-vanishing function may be used, the self-vanishing function operating to invalidate stored data upon expiration of the effective service period.

Figure 12:
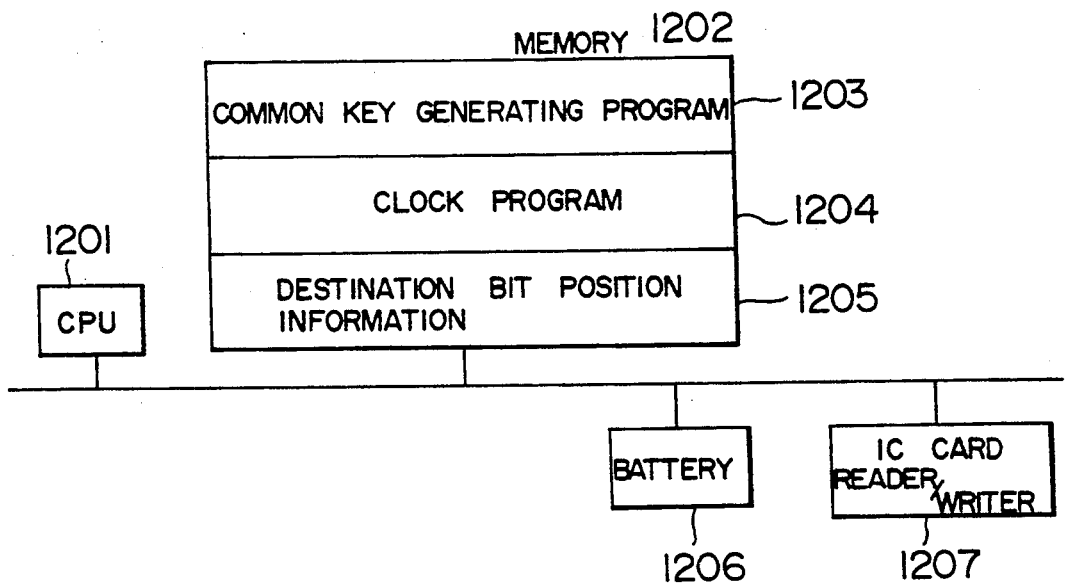
FIG. 12 is a block diagram showing an example of the internal configuration of a self-vanishing type IC card.

With an IC card having a self-vanishing function shown in FIG. 12, a CPU 1201 sequentially runs a common key generating program 1203 stored in a memory 1202 to output a common key from an IC card reader/writer 1207. Destination bit position information 1205 indicates the position of a bit in the destination information for the receiving station. Upon expiration of a certain effective service period, a clock program 1204 starts executing a process of turning off a battery 1206 to thereby stop the function of the IC card.

Second Embodiment

Figure 9:
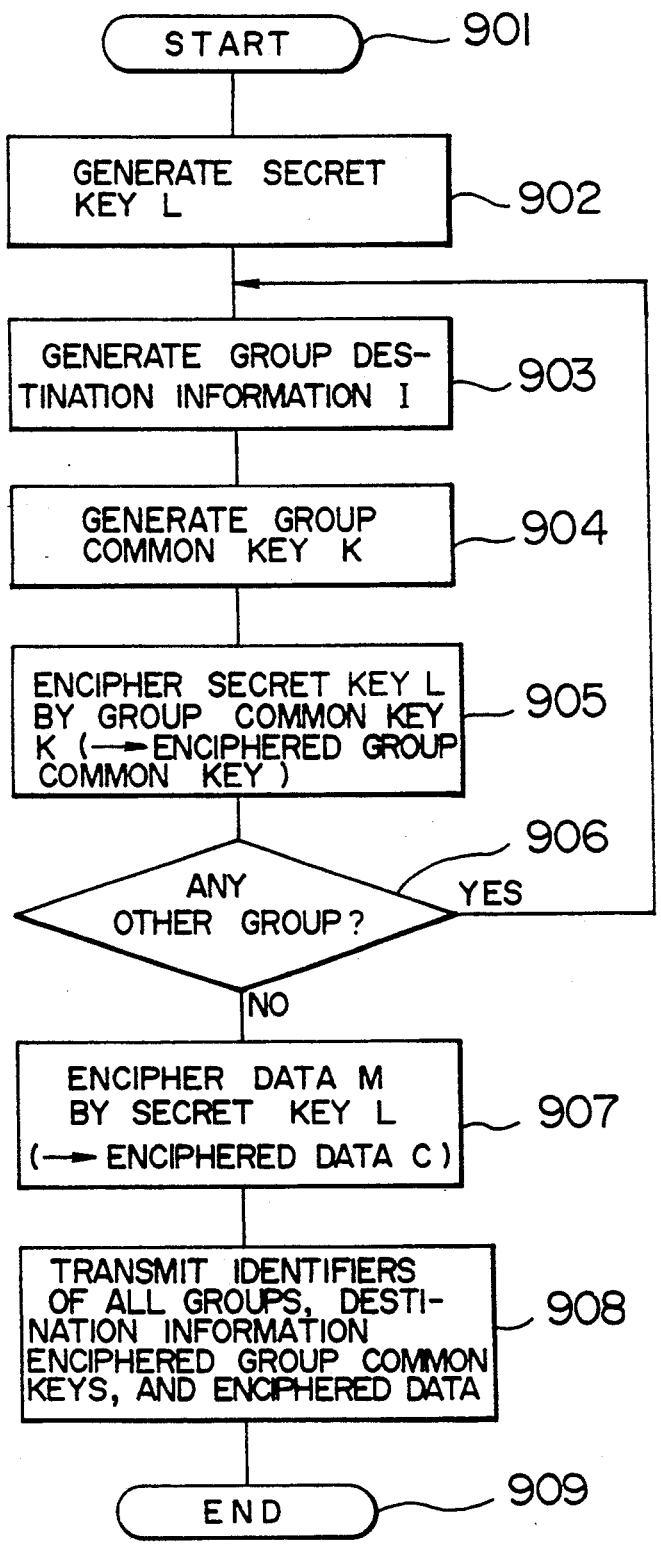
FIG. 9 is a flow chart showing the procedure to be executed by an information service station when there are a great number of receiving stations in the system shown in FIG. 1.
Figure 10:
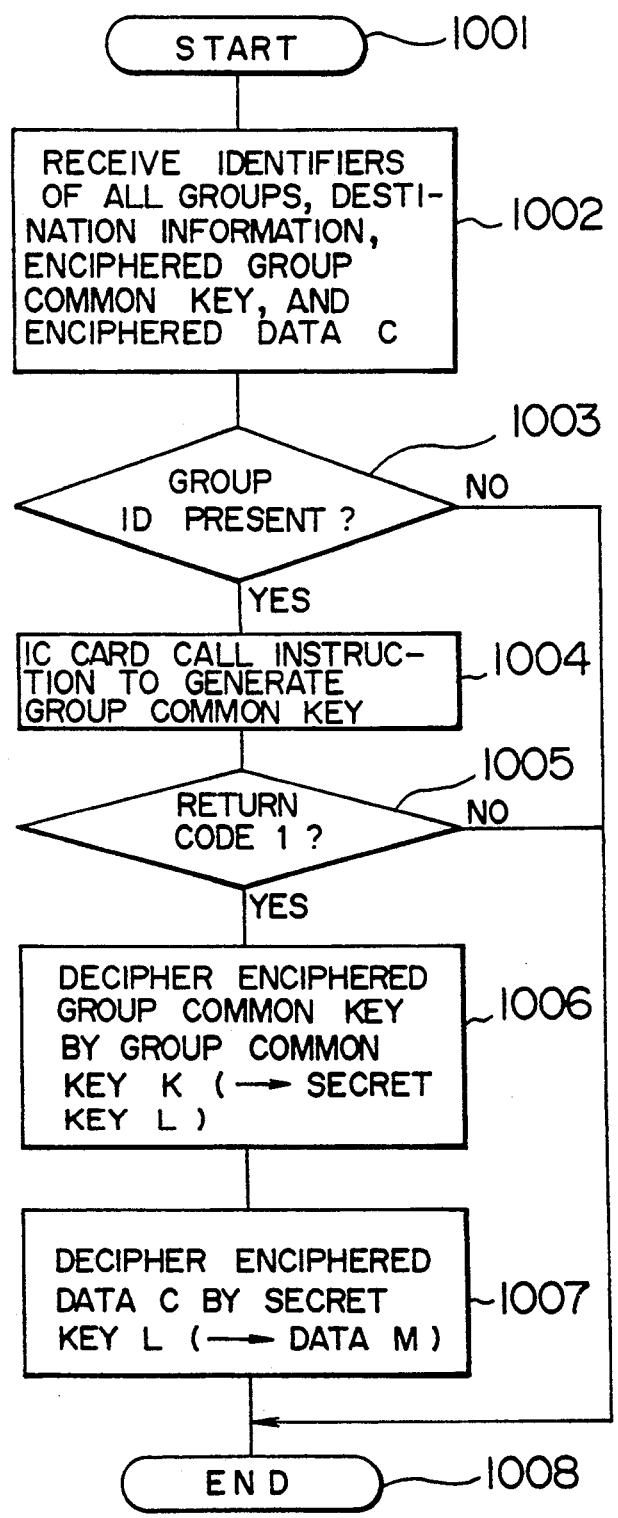
FIG. 10 is a flow chart showing the outline of the procedure to be executed by each receiving station upon transmission by the information service station shown in FIG. 1.
Figure 11:
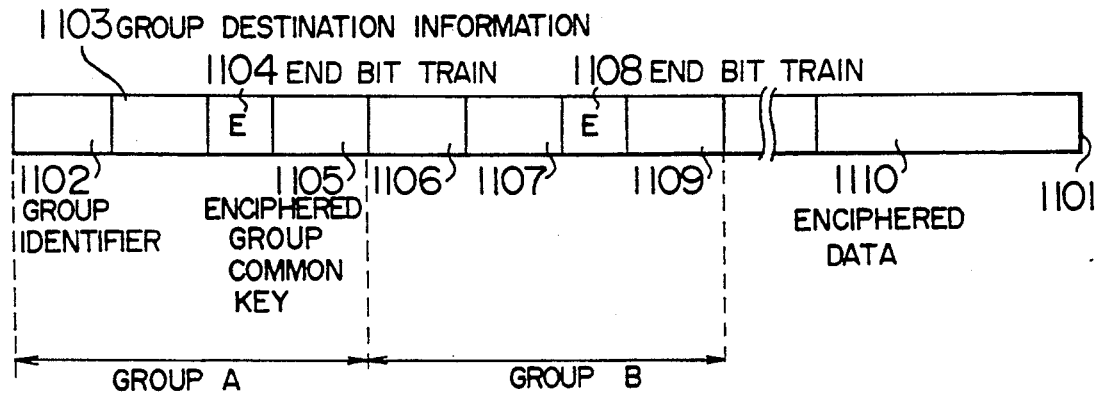
FIG. 11 is the format of data to be transmitted from the information service station to each receiving station, associated with the procedures shown in FIGS. 9 and 10.

Limited broadcast for a great number of receiving stations can be realized by modifying the procedures in the flow charts of FIGS. 2 and 4 and the data format of FIG. 6 of the first embodiment, to the procedures in the flow charts of FIGS. 9 and 10 and the data format of FIG. 11.

FIG. 9 is a flow chart showing the procedure to be executed by the information service unit at an information service station.

Upon actuation of the information service station (step 901), first a secret key L is generated (step 902). Next, group destination information I is generated (step 903), and a group common key K is generated (step 904). The generated group common key K is enciphered using the secret key L to obtain an enciphered group secret key P (step 905).

If there is any other group at step 906, the next group is subject to the procedure at the steps 903 to 905. If there is no other group, the control advances to step 907. At the step 907, the service information M stored in the file 105 is enciphered using the secret key L to obtain enciphered data C. Such encipherment may be realized by using the technique disclosed in the above-described U.S. Ser. No. 07/606,898 by inventors including the same inventors of the present invention. Identifiers Qs of all groups, destination information I, enciphered group secret keys Ps, and enciphered data C are transmitted at step 908 to complete the procedure (step 909).

The step 904 for generating a group common key may use the processes described with FIG. 3.

FIG. 10 is a flow chart showing the procedure to be executed by each user terminal 107, 108, 112, 114, and 116 shown in the system of FIG. 1.

A user terminal is actuated (step 1001) to receive all group identifiers Qs, destination information I, enciphered group secret keys Ps, and enciphered data C (step 1002). If the received data contains the group identifier Q of the receiving station, the control advances to step 1004, and if not, the control advances to step 1008 (step 1003). A group common key K is generated in accordance with the group identification information I by using an algorithm provided at the receiving station or stored in an IC card (step 1004). If a return code is "0" indicating that the group common key K is not present, the procedure is terminated at step 1008, and if the return code is "1" indicating that the group common key K is present, the control advances to step 1006 for deciphering the enciphered group secret key P to obtain the secret key L (step 1005). At the step 1006, the received enciphered group secret key P is deciphered using the generated group common key K to obtain the secret key L. Such decipherment may be realized by using the technique disclosed in the above-described U.S. Pat. No. 4,982,429, U.S. Ser. No. 07/606,898, or the like. The received enciphered data C is deciphered by using the deciphered secret key L, to thereby obtain the original service information M (step 1007). The step 1004 for generating a group common key K may be the same group common key generating procedure described with FIG. 5.

FIG. 11 shows an example of the format of data to be transmitted from the information service station to a receiving station.

Transmission data 1101 is constructed of group identifiers 1102, 1106, . . . of all groups, group destination information 1103, 1107, . . . , end bit trains 1104, 1108, . . . , enciphered group secret keys 1105, 1109, . . . and enciphered data 1110. In the case of group A for example, the group identifier 1102, group destination information 1103, end bit train E 1104, and enciphered group secret key 1105 belong to group A. Each receiving station in group A obtains the secret key by using the received information, and deciphers the ciphered data 1110 by using the obtained secret key. Similarly, the group identifier 1106, group destination information 1107, end bit train 1108, and enciphered group secret key 1109 are used by group B to decipher the enciphered data 1110.

As a modification of this second embodiment, the information service station holds the data of IDs of all receiving stations of all groups, and each group common key is generated from a hash total obtained by inputting, to the hash function, IDs of the receiving stations in the group having a data reception right and identified by the destination information.

On the side of each receiving station group, each receiving station holds IDs of all receiving stations of the group in the memory of its IC, and generates the group common key from a hash total obtained by inputting, to the hash function, IDs of the receiving stations of the group having a data reception right and identified by the destination information, and outputs it.

According to the present invention, in a secret communication system of a 1: N ratio between a service station and receiving stations, it is possible to prevent interception or tapping of a ciphertext by a third party, and improve a processing speed by reducing the amount of processed data as compared with a conventional ID-based key generating method.

The following comparison results between the present embodiments and a conventional method were obtained with respect to a key generating speed in a system having 1000 receiving stations which are all permitted for reception.

Figure 13:
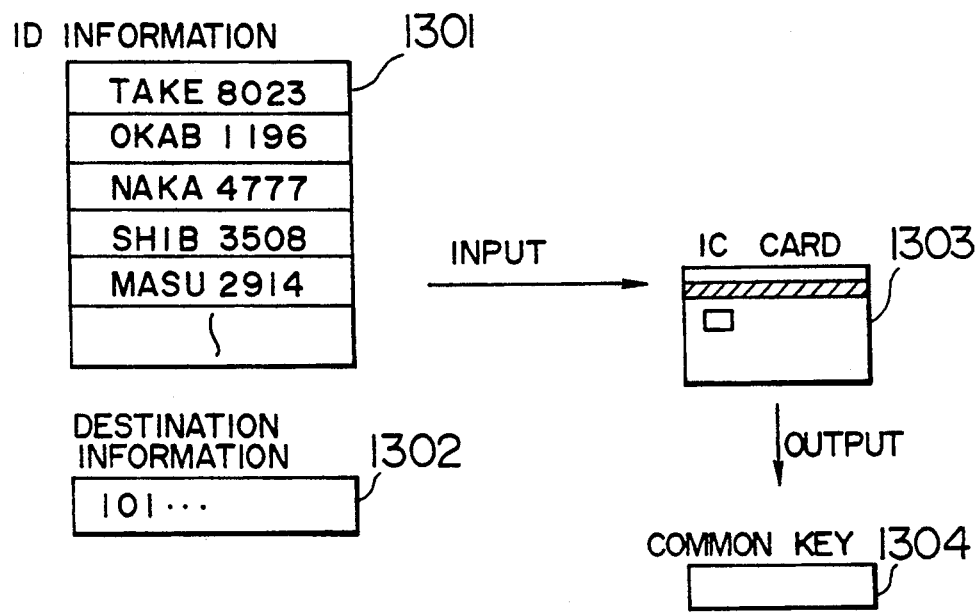
FIG. 13 is a diagram illustrating the data flow of an IC card according to the ID-based key generating method.

FIG. 13 illustrates a data flow of an IC card using the ID-base key generating method such a U.S. Ser. No. 07/606,898. In generating a key, each terminal inputs user's ID information 1301 indicated by received destination information 1302 to an IC card 1303. Each ID has an 8-character length, i.e., 1 byte×8=84 bits. Each terminal processes the data inputted to the IC card to output a common key 1304. The input data amount is 64 (number of ID bits)×1000 (number of receiving stations)=64 K bits.

The following results were obtained using an IC card storing a program of the present invention method. Namely, the key generating speed was about 50 kbs, other processing speeds such as input processing speed were about 2.8 kbs, and the time required for checking the IC card was 0.5 second. Therefore, in the case of the method illustrated in FIG. 13, the total processing time was $64/2.8 + 64/50 + 0.5 = 24.6$ second.

Figure 14:
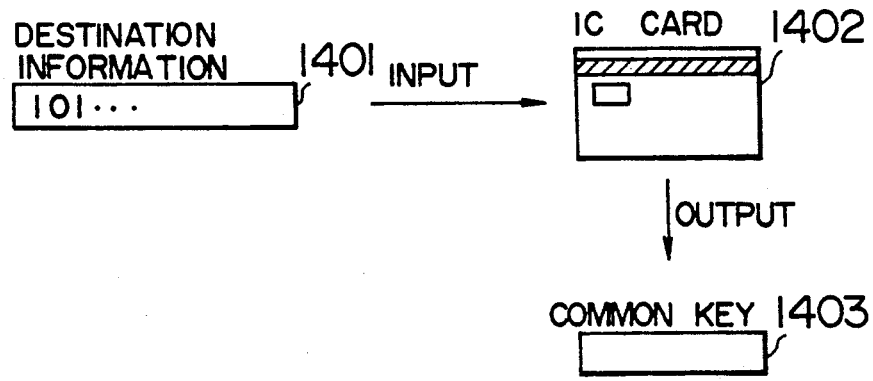
FIG. 14 is a diagram illustrating the data flow of an IC card following the key generating method according to an embodiment of the present invention.
Figure 15:
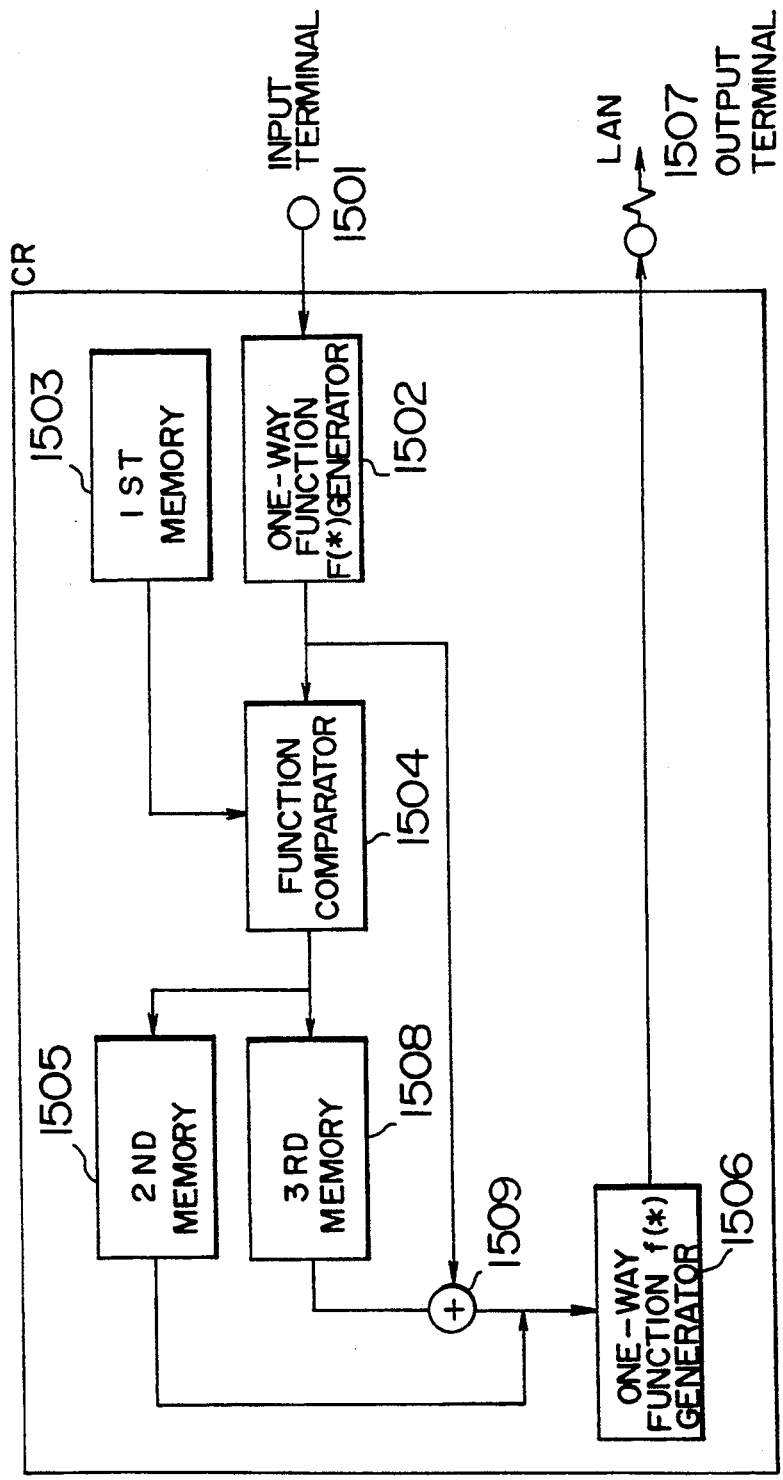
FIG. 15 is a block diagram explaining a conventional key generating method.

FIG. 14 illustrates the data flow of an IC card using the present invention key generating method. In generating a key, received destination information 1401 is inputted to the IC card 1402. Each terminal processes the data inputted to the IC card to output a common key 1403. Under the above-described conditions, the input data is only the destination information of 1000=1 K bits. Therefore, the total processing time was $1/2.8 + 1/50 + 0.5 = 0.88$ second. The actual experiments confirmed that the present invention method improves a processing time as compared with the above-described subject comparison method.

What is claimed is:

1. A limited broadcast system having a plurality of receiving stations and an information service station for providing service information to said receiving stations through encipherment broadcast, comprising:

first means provided at said information service station for generating destination information for designating a destination station to which a data reception right for said service information is given, generating a hash total as a common key by using said destination information, enciphering said service information by using said common key, and for broadcasting said enciphered service information and said destination information; and second means provided at each of said plurality of receiving stations for receiving said enciphered service information and said destination information, for confirming said data reception right by using said destination information, generating said hash total as said common key by using said destination information in response to the confirmation result of said data reception right, and deciphering said enciphered service information by using said common key.

2. A limited broadcast system according to claim 1, wherein said second means includes a processing unit such as an IC card physically capable of preventing reading and changing an inner process to be executed by said processing unit and, said processing unit executes processes at said each receiving station of confirming said data reception right by using said destination information, and of generating said hash total as said common key by using said destination information if the confirmation result shows a presence of said data reception right.

3. A limited broadcast system having a plurality of receiving stations and an information service station for providing service information to said receiving stations through encipherment broadcast, comprising:

first means provided at said information service station for storing identifications (IDs) of all subscriber stations to said limited broadcast system, and second means provided at information service station for generating destination information for designating a destination station to which a data reception right for said service information is given, generating a hash total as a common key by using said IDs indicated by said destination information, for enciphering said service information by using said common key, and broadcasting said enciphered service information and said destination information; and third means provided at each of said plurality of receiving stations for storing IDs of all subscriber stations to said limited broadcast system, and fourth means provided at said each receiving station for receiving said enciphered service information and said destination information, confirming said data reception right by using said destination information, for generating said hash total as said common key by using said IDs indicated by said destination information if the confirmation result of said data reception right shows a presence of said data reception right, and deciphering said enciphered service information by using said common key.

4. A limited broadcast system according to claim 3, wherein said fourth means includes an IC card having a processor physically capable of preventing reading and changing an inner process to be executed by said processing unit, and said processor in the IC card executes processes at said each receiving station of storing IDs of all subscriber stations to said limited broadcast system, of confirming said data reception right by using said destination information, and of generating said hash total as said common key by using said IDs indicated by said destination information if the confirmation result shows a presence of said data reception right.

5. A limited broadcast system according to claim 1, wherein an end bit train is added to the end of the bit train of said destination information to indicate the end of said destination information, and said destination information is made to have a variable length depending upon the number of destination stations by setting said end bit train to the end of said destination information.

6. A limited broadcast system having a plurality of receiving station groups and an information service station for providing service information to said receiving station groups through encipherment broadcast, comprising:

means provided at said information service station for enciphering said service information by using a secret key, for generating group destination information for designating a destination station within each group to which a data reception right for said service information is given, generating a hash total as a group common key by using said group destination information, for enciphering said secret key by using said group common key to obtain an enciphered group secret key, and broadcasting said enciphered service information, said group destination information, and said enciphered group secret key; and means provided at each receiving station within each of said plurality of receiving station groups for receiving said service information enciphered by said secret key, said group destination information, and said enciphered group secret key, confirming said data reception right by using said group destination information, generating said hash total as said group common key by using said group destination information if the confirmation result of said data reception right shows a presence of said data reception right, deciphering said enciphered group secret key by using said group common key to obtain said secret key, and for deciphering said enciphered service information by using said secret key.

7. A limited broadcast system according to claim 2, wherein said processing unit at said each receiving station includes means for storing an initial value for calculating said hash total and an effective period for limiting a service term for said initial value, and means for comparing time information with said effective period, whereby only when said time information is within said effective period, said initial value is allowed to be accessed and read.

8. A limited broadcast system according to claim 1, wherein said information service station further comprises:

means responsive to a request for subscribing a new receiving station, for adding a bit after the end of said destination information, said bit being used for indicating a presence/absence of said data reception right of said new receiving station, and for issuing said processing unit to said new receiving station, the position data of said bit in said destination information, said initial value, and said effective period being written in said processing unit;

means responsive to a request for renewing said effective period of said receiving station, for clearing the old initial value and old effective period from said processing unit and writing a new initial value and a new effective period; and means responsive to a notice of loss of said processing unit by said receiving station, for entering an "invalid" indication data to the bit of said destination information of said receiving station during said effective period with respect to said initial value, and for assigning a new receiving station with the bit position of said destination information of said receiving station after expiration of said effective period.

9. A limited broadcast system according to claim 1, wherein said processing unit for said receiving station includes a battery back-up timer, whereby if it is judged from a comparison between an output value of said timer and said effective period that said output value exceeds said effective period, said data reception right is self-distinguished by erasing said stored initial value.

10. A limited broadcast method of providing predetermined information from at least one transmitting station to a plurality of receiving stations through encipherment broadcast, comprising the steps:

at said at least one transmitting station, generating destination information for designating a destination station to which a data reception right for said predetermined information is given; generating a hash total as a common key by using said destination information; enciphering said predetermined information by using said common key; and broadcasting said enciphered predetermined information and said destination information; and at each of said plurality of receiving stations, receiving said enciphered predetermined information and said destination information, of confirming said data reception right by using said destination information; generating said hash total as said common key by using said destination information in response to the confirmation result of said data reception right; and deciphering said enciphered predetermined information by using said common key.

11. A limited broadcast method according to claim 10, wherein the steps at said each receiving station of confirming said data reception right by using said destination information and generating said hash total as said common key by using said destination information in response to the confirmation result of said data reception right, are executed by a processing unit such as an IC card physically guarded so as to prevent reading and changing an inner process to be executed by said processing unit.

12. An information service method of providing service information from an information service station to a plurality of receiving stations through encipherment broadcast, comprising the steps:

at said information service station, storing identifications (IDs) of all subscriber receiving stations to said information service station; generating destination information for designating a destination station to which a data reception right for said service information is given, generating a hash total as a common key by using said IDs and said destination information, enciphering said service information by using said common key, and broadcasting said enciphered service information and said destination information; and at each of said plurality of receiving stations, storing IDs of all subscriber receiving stations to said information service station; and receiving said enciphered service information and said destination information, confirming said data reception right by using said destination information, generating said hash total as said common key by using said IDs and said destination information in response to the confirmation result of said data reception right, and deciphering said enciphered service information by using said common key.

13. An information service method according to claim 12, wherein said each receiving station has an IC card supplied from said information service station, and said IC card executes processes of storing IDs of all subscriber stations to said information service station, confirming said data reception right by using said destination information, and generating said hash total as said common key by using said IDs and said destination information if the confirmation result shows a presence of said data reception right, to thereby prevent an inner process of said IC card from being externally read or changed.

14. A limited broadcast method according to claim 10, wherein an end bit train is added to the end of the bit train of said destination information to indicate the end of said destination information, and said destination information has a variable length depending upon the number of destination stations by setting said end bit train to the end of said destination information.

15. An information service method of providing service information to a plurality of receiving station groups through encipherment broadcast, comprising:

at said information service station, enciphering said service information by using a secret key, generating group destination information for designating a destination station within each group to which a data reception right for said service information is given, generating a hash total as a group common key by using said group destination information, enciphering said secret key by using said group common key to obtain an enciphered group secret key, and broadcasting said enciphered service information, said group destination information, and said enciphered group secret key; and at each receiving station within each of said plurality of receiving station groups, receiving said service information enciphered by said secret key, said group destination information, and said enciphered group secret key, confirming said data reception right by using said group destination information, generating said hash total as said group common key by using said group destination information if the confirmation result of said data reception right shows a presence of said data reception right, deciphering said enciphered group secret key by using said group common key to obtain said secret key, and deciphering said enciphered service information by using said secret key.

16. An information service method according to claim 11, further comprising at said information service station, storing in advance an initial value for calculating said hash total and an effective period for limiting a service term for said initial value, and at said each receiving station, comparing time information with said effective period, and of allowing said initial value to be accessed and read only when said time information is within said effective period.

17. An information service method according to claim 11, further comprising at said information service station, in response to a request for subscribing an additional receiving station, adding a bit after the end of said destination information, said bit being used for indicating a presence/absence of said data reception right of said additional receiving station, and of issuing said processing unit to said additional receiving station, the position data of said bit in said destination information, said initial value, and said effective period being written in said processing unit;

in response to a request for renewing said effective period of said receiving station, clearing the old initial value and old effective period from said processing unit and writing a new initial value and a new effective period; and in response to a notice of loss of said processing unit by said receiving station, entering an "invalid" indication data to the bit of said destination information of said receiving station during said effective period with respect to said initial value, and assigning a new receiving station with the bit position of said destination information of said receiving station after expiration of said effective period.

18. An IC card constituting said processing unit at said each receiving station suitable for use with the limited broadcast method according to claim 11, comprising a battery back-up timer, and means for erasing said stored initial value in response to a judgment from a comparison between an output value of said timer and said effective period that said output value exceeds said effective period.

* * * * *